United States Patent [19]

Scodino et al.

[11] 4,444,528

[45] Apr. 24, 1984

[54] METHOD AND APPARATUS FOR RECOVERING SUBMERGED PIPELINE

[75] Inventors: Ambrogio Scodino, S. Donato Mi.; Adalberto Raimondi, Nerviano, both of Italy

[73] Assignee: Saipem, S.p.A., Milan, Italy

[21] Appl. No.: 257,970

[22] Filed: Apr. 27, 1981

Related U.S. Application Data

[63] Continuation-in-part of Ser. No. 195,732, Oct. 10, 1980, abandoned, which is a continuation of Ser. No. 29,108, Apr. 11, 1979, abandoned, which is a continuation of Ser. No. 770,859, Feb. 22, 1977, abandoned.

[30] Foreign Application Priority Data

Feb. 25, 1976 [IT] Italy .................... 20563 A/76

[51] Int. Cl.³ ............................................ F16L 1/04
[52] U.S. Cl. .................................... 405/173; 405/158
[58] Field of Search ............ 405/158, 169, 170, 173; 414/745, 747; 285/18, 24

[56] References Cited

U.S. PATENT DOCUMENTS

| | | | |
|---|---|---|---|
| 3,978,892 | 9/1976 | Scodino | 405/173 X |
| 4,014,180 | 3/1977 | Kelly et al. | 405/170 |
| 4,068,492 | 1/1978 | Reneau | 405/170 |
| 4,091,514 | 5/1978 | Motes-Conners | 405/170 X |

Primary Examiner—David H. Corbin
Attorney, Agent, or Firm—George P. Hoare, Jr.

[57] ABSTRACT

Apparatus for and a method of recovering a submerged pipeline is provided with such apparatus and method being particularly useful with pipelines laid on the bottom of a deep body of water. The apparatus includes support means haivng clamping means thereon for clamping the pipeline and lifting it from its bed, cutter means mounted on the support means for cutting the clamped pipeline to provide a pipeline end, and a recovery header removably mounted to the support. In operation, drive means move the header from its rest position into the clamped and cut pipeline end in an inserted state and retaining means on the support means retain the header in its inserted position. The header and pipeline section are ready for removal. A pulling and guiding flexible cable system from a vessel or barge associated with the apparatus can be used to position the apparatus under water and to move the header with the retained pipeline from the body of water to the vessel. The invention greatly facilitates the recovery of pipeline from a deep sea bottom and can dispense with use of divers normally required heretofore.

27 Claims, 19 Drawing Figures

METHOD AND APPARATUS FOR RECOVERING SUBMERGED PIPELINE

This application is a continuation-in-part application of U.S. application Ser. No. 195,732 filed Oct. 10, 1980, now abandoned, which in turn was a continuation of application Ser. No. 29,108 filed Apr. 11, 1979, now abandoned, which in turn was a continuation application of application Ser. No. 770,854 filed Feb. 22, 1977, now abandoned.

FIELD OF THE INVENTION

The ever growing demand for the laying and using of submerged pipeline in deep water has created the need for means to permit the recovery of submerged pipeline by a vessel more easily, more quickly, more accurately and thus cheaper as well as safer for the operating personnel than has been possible heretofore. As is well known, many problems exist when laying and using submerged pipelines. One example of such a problem that occurs during pipeline laying operation that has to be abandoned during the laying thereof as a result of adverse weather conditions. Another example of such a problem is the one created by pipe breakage or damage during the laying thereof or such breakage or damage occurring to the pipeline after being laid. Another example is the problem created when the pipelaying operation is carried out by the method of laying pipe sections which are to be connected to one another by lifting them on board the pipelaying vessel and thereafter joining the end sections to one another.

At present, the most widely used method for recovering submerged pipelines, regardless of whether it is damaged or not, comprises a series of steps utilizing a particular type of apparatus. More specifically, such prior method has involved the use of a lifting mechanism equipped with clasping jaw which, by means of a winch and cable mechanism carried by the pipelaying vessel, drops the lifting clamp mechanism down to the area of the pipeline to be recovered. Two frogmen or divers are then sent down and manually mount the lifting clamp mechanism astraddle the pipeline to be recovered and thereafter tighten same to the pipeline.

The winch mounted on the pipelaying vessel is then actuated to draw the lift mechanism upward by means of the cable. This results in the clamped pipeline being lifted from the sea bottom to the extent necessary to enable the frogmen to gas-cut the portion of the pipeline to be removed and recovered. Thereafter, a sealing header or plug is dropped from the pipelaying vessel, by means of a cable, said header having an outlet tube passed therethrough. The outlet tube is equipped with a valve and further includes tightening and sealing means which must be manually positioned by the frogmen in front of the end of the pipeline to be recovered. The valve will be manually inserted into the pipeline and locked thereon by means of the tightening and sealing means. The pipeline will then be emptied by means of a cylindrical tool, or "pig", or by means of balls which are urged from either end of the pipeline by compressed air to eject or discharge the water through the other pipeline end and through the outlet tube of the header or sealing plug. The lifting clamp mechanism is released from the pipeline section to be recovered and raised on board the pipelaying ship by a winch mechanism actuating a pulling cable which has previously been fastened to the sealing header or plug.

It is readily apparent that this widely used method cannot be employed in an economically acceptable manner in the case of pipelines which have been laid on the bottom of bodies of deep water. Actually, if the water depths are great, the operation of the positioning of the lifting and clamp mechanism onto the pipeline and also the operation of arranging the sealing plug in front of the end of the pipeline to be recovered and slipping such a plug into the pipe end cannot be carried out manually by frogmen or divers. Under such circumstances, the clamping and plugging operations must be done by submarines, equipped with clamps and searchlights, at a considerable risk and expenditure, and only where undersea streams are not present. In addition, the gas-cutting of the damaged portion of a pipeline can only be carried out down to a certain depth by a diver equipped with a deep-sea helmet. Therefore, at great depths, expensive automatic cutting equipment is required to secure the pipeline section.

It also must be kept in mind that such conventional apparatus offered by the contemporary technique employed for the recovery of a pipeline from the sea bottom is impaired by other drawbacks of both an operational and an economical nature. When emptying the pipeline, the placement of the "pig" or the balls used for ejecting water at the farther end of the pipeline to be emptied generally gives rise to a violent bump against the pipe-sealing plug which may result in the plug being displaced from its correct position causing the pipeline section to be recovered to be filled with water again. Furthermore, the sealing and clamping means between the plug and the pipe surface are usually both complex in design and expensive, so that they are unable, beyond a reasonable doubt, to insure the possibility of creating an efficient pulling stress upon the pipeline to be lifted by means of the cable which has been fastened to the plug. An abrupt jerk is often enough to draw the plug out of the pipe so that apart from the material damages, the operation of removing water from the pipeline must be repeated.

SUMMARY OF THE INVENTION

An object of the present invention is to eliminate the hereinbefore enumerated drawbacks possessed by prior methods and apparatus by providing a single piece of apparatus which makes possible the recovery by a vessel of pipeline, both damaged and undamaged, which has been laid on the bottom of a deep body of water in a more simple and efficient and much cheaper manner. In general, the apparatus comprises a clamping and lifting mechanism for clamping to the submerged pipeline a means for automatically cutting the clamped pipeline section, a pulling and sealing header removably supported on the apparatus which automatically can be positioned in the cut pipeline section, retaining means for retaining the header within the cut pipeline section, and means for removing the cut pipeline section and the associated header from the water.

Preferably, the recovery apparatus, in accordance with the present invention, comprises a support mechanism such as a sturdy, twin-lattice frame supported by means of a ring to a sustaining cable connected to a winch present on the pipelaying vessel. The support mechanism is provided with clamping and lifting means at its lower portion for association with the pipeline. The clamping and lifting means include hydraulically actuated jaws, and means for guiding the support mechanism onto the pipeline to be removed. The support mechanism is also provided with means for removably supporting and effecting the totation of the header and the axially sliding of same into the cut pipeline section. The header includes a discharge bore which extends longitudinally therethrough and a transverse bore which extends into the end of the header inserted into the cut pipeline.

Means are also provided in association with the support mechanism for drilling the pipeline and for introducing a dowel for latching the header to the pipeline into the drilled opening forming the transverse bore of the sealing header. The means are mounted on the support mechanism so as to act between the jaws of the clamping and lifting means for the pipeline just at the spot in which the transverse bore of the header will be located after the header has been inserted into the pipeline section to be removed. At the opposite end of the header, an automatic hooking mechanism for the pulling cable which will lift the header and the retained cut pipeline on board the pipe-laying vessel is provided.

According to another feature of the present invention, the means for cutting the portion of the pipeline section to be removed comprises two half-rings which are hinged at the top to the casing of the clamping and lifting means. The half-rings are clamped about the pipeline so as to embrace it by the means of a double-acting hydraulic jac. The half-rings also are integral with two toothed crown half-gears which are the supporting and guiding members for a dolly which can be positioned therealong by a small hydraulic drive means. The dolly supports a vertical guide along with hydraulic feed means will move the cutting wheel, the wheel being rotated in its turn by a small hydraulic motor.

Such a cutter, in addition to doing away with the short-comings of conventionally used gas-cutting equipment, makes the achieving of the cutting operation extremely easy, quick and accurate at any depth. Such a cutting operation comprises the steps of closing the two half-rings with their toothed crown gears about the pipeline by actuating a double-acting hydraulic jack, actuating the hydraulic motor to rotate the cutting mechanism, moving the cutting mechanism towards the pipeline by actuating a hydraulic motor, and lastly, rotating the cutting mechanism planetarily about the peripheral surface of the pipeline by actuating hydraulic drive means. All of these operations can be quickly carried out by a single frogman or diver since all the controls for the hydraulic jack and hydraulic means and motors are centralized on a single pushbutton control board located in a favorable position such as, for example, on the pipe clamping and lifting means.

According to a still further feature of this invention, the guide means for guiding the support mechanism such as the twin-lattice frame onto the pipeline section to be recovered comprises a guiding ring which has a flange and is releasably mounted through an automatic release mechanism positioned at the end of a cantilever bracket jutting from a side of the twin-lattice frame and which is integral therewith. A guiding cable is inserted into the guide means and is held taut between the winch means mounted in the pipelaying vessel and the pipeline to be recovered to which it is fastened by any suitable means such as a holdfast.

With the apparatus of the present invention, it is possible to avoid the wearisome work of frogmen or divers involved in manually bringing the apparatus lowered from the pipelaying ship onto the pipelines. Even if strong subsea currents are present, the guide means of the present invention will still lower the recovery apparatus accurately to the pipeline. In addition, as the recovery apparatus reaches the pipeline, the guiding ring of the apparatus becomes the center of rotation about which the recovery apparatus can be rotated so that the positioning of the clamping means astraddle the pipeline is greatly facilitated.

According to yet another feature of the present invention, the automatic release system of the guiding ring from the bracket comprises a pin inserted in a bore of the flange of the guiding ring and of a matching bore through the bracket. The pin is integral with the piston of a double-acting hydraulic jack supported by the bracket and actuated from a remote location through a pushbutton mounted on a control board. Therefore, by the actuation of the double-acting hydraulic jack, the pin can be withdrawn and the recovery apparatus can be cleared of the guiding ring.

According to a still further feature of the present invention, the means for removably supporting, rotating and axially sliding the sealing and pulling header include a rod or vertical sub-frame, the bottom end of which is hinged to a pair of small brackets which jut from the side and below the twin-lattice frame. At the mid-point of the sub-frame are hinged the pistons of two telescopic hydraulic jacks which can be remotely controlled by pushbuttons mounted on the control board. The sub-frame includes a longitudinal guideway along which a dolly can slide. The dolly is driven by a remotely controlled hydraulic motor and is integral with a supporting bridge inserted in an appropriate slot formed in the sealing and pulling header wherein it is removably latched by the means of an automatic-release system.

By this arrangement, the operation of locating the sealing header in front of the end of the pipeline to be recovered and of introducing the header into the pipeline is both completely automatic and simple. It consists in rotating the sub-frame and also the header by means of the telescopic hydraulic jacks, until the longitudinal axis of the header becomes coaxial with the axis of the pipeline to be recovered, and then inserting the header into the pipeline by sliding the dolly along the longitudinal guide of the sub-frame.

According to a still further feature of the present invention, the automatic release system for the sealing and pulling header of the supporting bridge comprises a pin which is inserted in a specially provided bore of the header and is integral with the piston of a hydraulic ram of the double-acting type supported by the supporting bridge which is remotely actuated through a pushbutton positioned on the control board.

Yet another feature of the present invention is the provision of an automatic-latching mechanism for hooking the pulling cable to the header for lifting the pipeline on board the vessel which comprises a tooth hinged at one end within a recess present in the header and which is urged by a spring from the opposite end against a shoulder. The shoulder is so positioned in the recess so as to prevent the recess of the bridge from being rotated outwards. Thus, in order to insert the eyelet of the pulling cable in the recess, the eyelet is pressed against the tooth until the bias of the spring is overcome and the tooth is rotated inwardly. Thereafter, under a pulling stress, the eyelet is prevented from being unthreaded inasmuch as the tooth is urged against the shoulder.

According to still another feature of the present invention, the means for drilling the pipeline and for inserting a retaining dowel in the drilled transverse bore of the sealing and pulling header to secure the header to the pipeline comprise a vertical rod or pin releasably connected at its upper end to a hydraulic ram and having a cutting wheel releasably connected thereto. The ram is remotely controlled by a push-button mounted on the control board. The rod and the ram are rotated about the longitudinal axis of the rod by a hydraulic motor supported by the twin-lattice frame and is controlled from a remote location by means of a pushbutton positioned on the control board. By rotating the cutting-wheel-carrying rod and gradually moving it downwardly by means of a hydraulic ram, the top portion of the pipe will be first drilled, and thereafter the rod will penetrate the underlying transverse bore present in the sealing and pulling header and, lastly, the lower portion of the pipeline. At this state of the operation, by detaching the rod from the piston of the hydraulic ram by any suitable means and then removing the cutting wheel so as to recover the wheel, the rod remains inserted in the pipeline and the header and thus acts like a latching dowel which, in addition to affording a reliable and safe latching of the sealing and pulling header to the pipeline to be recovered, will further act as a stop for the balls to be used for removing the water from the pipeline section to be removed.

According to yet another feature of the present invention, the rod or dowel for securing the sealing and pulling header to the pipeline section to be removed is fitted with tooth-like shoulders hinged in internal recesses formed in the rod and biassed by spring means to prevent their ejection from the recesses. The teeth-like shoulders are maintained in the recesses by the inner wall of a vertical cylinder fastened to the hydraulic motor, the shoulder being allowed to emerge only as the rod enters the wider space of the transverse bore of the sealing and pulling header. By this arrangement, the latching rod or dowel cannot be withdrawn from the transverse bore of the header once it has been slipped into position.

According to still another aspect of the present invention, there is provided a method of recovering a submerged pipeline, comprising:

lowering apparatus in accordance with the invention to the pipeline to be recovered;
clamping the apparatus to the pipeline using the clamping means;
cutting through the pipeline using the cutter;
moving the header from the rest position to the inserted position;
operating the retaining means to retain the header within the pipeline;
releasing the header from the support; and
raising the header with the pipeline to the surface.

When strong undersea currents are present, the method can include, after the retaining means step, the additional steps of:

raising the apparatus, with the pipeline clamped thereto, to a small depth, relative to the total depth, below the surface;
connecting a cable to the header for raising the header; and
lowering the apparatus, with the pipeline, to the bottom of the water.

Thereafter, the header is removed from the support and the header, with the pipeline, is raised to the surface.

BRIEF DESCRIPTION OF THE DRAWINGS

The invention is now described with reference to the accompanying drawings which illustrate a preferred embodiment of the invention which is given by example only and in which.

DESCRIPTION OF THE PREFERRED EMBODIMENT

Figure 7:
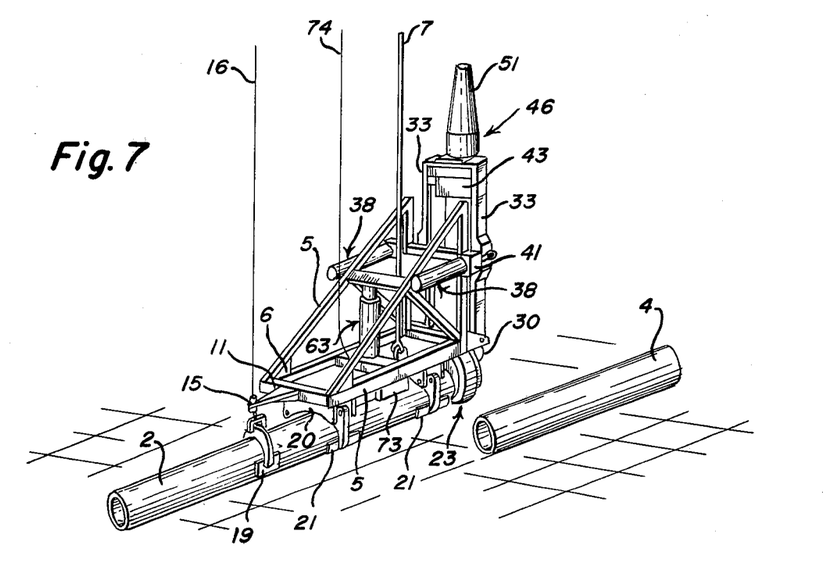
FIG. 7 is a diagramatic perspective view of the apparatus shown in FIG. 1.

Turning now to the drawings and with particular reference to FIGS. 1 and 5-7, the apparatus made in accordance with the present invention and generally designated by reference numeral 1 is shown in a position for recovering a pipeline 2 laid on the sea bottom 3 after the damaged section 4 of the pipeline 2 has been severed. The apparatus 1 includes a stiff twin-lattice support frame 5 that is generally triangular-shaped in configuration. The twin-lattice support frame 5 is provided with reenforcing angleirons 6 at the various corners to provide additional strength to the support frame 5. The bottom portion of the support frame 5, as best illustrated in FIG. 7, is rectalinear in configuration and connects the twin vertical side portion of the frame 5 to one another in laterally spaced relationship. The support frame 5 is supported by a sustaining cable 7 which is provided with an eye or ring portion 8 which receives therein a cradle portion 9, the long end of which is pivotally hinged by pivot 10 to the midpoint of the bottom portion of the support frame 5.

Figure 1:
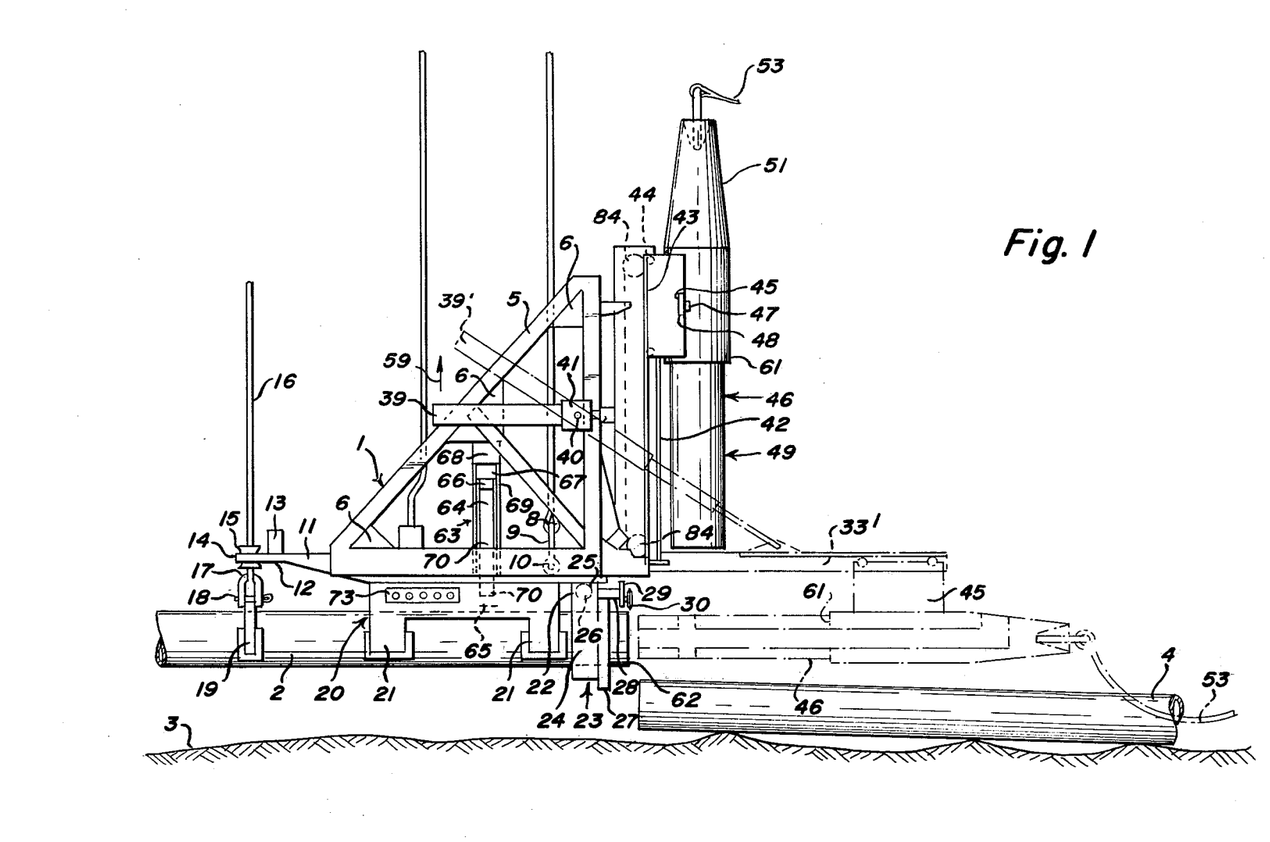
FIG. 1 is a diagramatic side elevational view of the recovery apparatus made in accordance with the present invention shown clamped onto the pipeline to be recovered wherein the pipeline has been lifted from the sea bottom and after the damaged section of the pipeline has been severed, the drawing also showing, in phantom, the positions of the sealing and pulling heads and the supporting device for the heads after rotation of the heads to a position coaxial with the pipeline.
Figure 2:
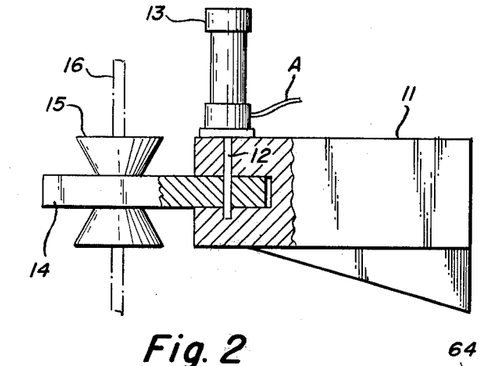
FIG. 2 is a fragmentary side cross-sectional view of the releasable system for use with the guiding cable connected between the pipeline and the pipelaying vessel.
Figure 8A:
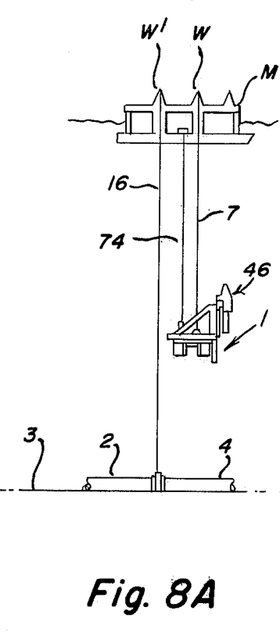
FIGS. 8A, 8B and 8C are side elevation views in minaturized form illustrating three stages of the procedure to be employed in attaching and recovering a pipeline from a pipeline vessel in accordance with the present invention, with FIG. 8C illustrating the inserted position of the header in the pipeline.
Figure 8B:
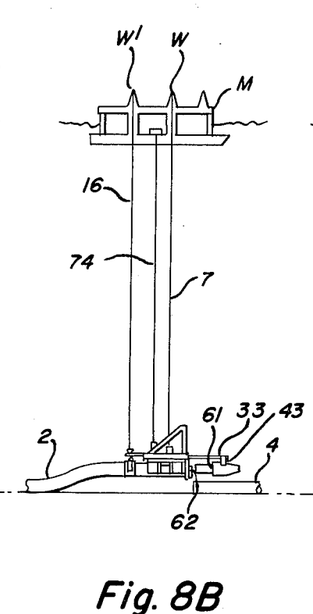
Figure 8C:
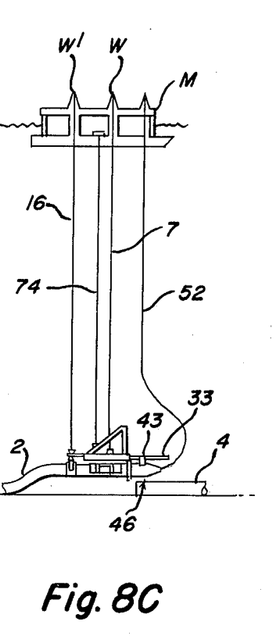
Figure 9:
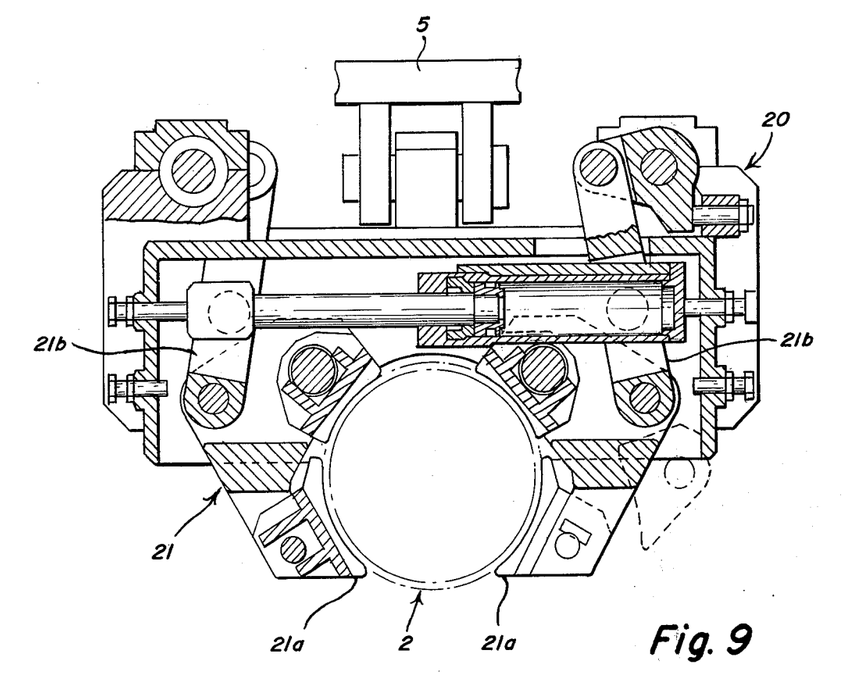
FIG. 9 is an enlarged front cross-section of the clamping means, the structure and operation of which is set forth in detail in U.S. Pat. No. 3,897,099.

A support bracket 11, as best shown in FIG. 7, is secured to one end of the bottom portion of the support frame 5 and extends outwardly therefrom in a horizontal plane. The free end of the support bracket 11 is provided with a slot into which a releasable bracket 14, as shown in FIG. 2, is positioned, which in turn is provided with an apeture into which a guiding eye portion 15 is positioned through which a guiding cable 16 will pass. As shown in FIG. 8A, the upper end of the cable 16 is connected to a tensioning winch mechanism W' and at its bottom end, as shown in FIG. 1, to a shackle 17. The shackle 17 is hingedly secured by pin 18 to a clamping mechanism 19 adapted to be secured in a straddling relationship to the pipeline 2.

Figure 17:
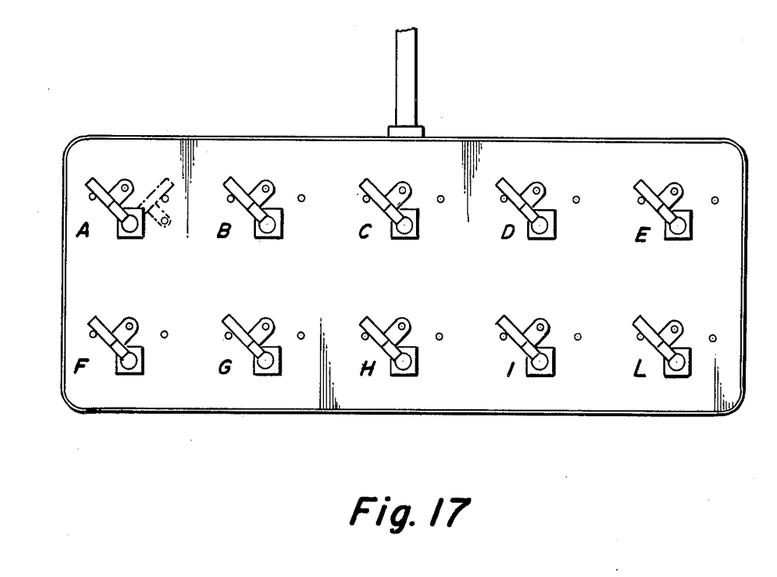
FIG. 17 is a front view of the control dashboard in which the letters A–L correspond to like letters where appropriate indicating various mechanisms.

The release mechanism permitting the automatic release of the support frame 5 from association with the guiding cable 16 and the clamping mechanism 19 is best shown in FIG. 2. As illustrated, the releasable bracket 14 is retained in the slot at the forward end of the bracket by a vertically disposed pin 12 passing downwardly through the releasable bracket 14, the upper end of the through pin 12 being secured to the operating piston of a double-acting hydraulic ram 13. The actuation of the hydraulic ram 13 is achieved through line A which is connected to actuation mechanism A mounted, as shown in FIG. 17, on the control panel board. As will be readily apparent, the releasable bracket 14 will be locked in place by means of the pin 12 to the bracket 11 secured to the support frame 5 when the recovery mechanism 1 is lowered to the pipeline 2 and the clamp 19 is secured to the pipeline 2 to secure guiding cable 16 thereto. To release the support frame 5 from association with the cable 16, the actuation of the double acting hydraulic ram 13 will result in the through pin 12 being raised, thus permitting the bracket 14 to be released from the bracket 11, thus disengaging the support frame 14 from the guiding cable 16.

Clamping means, generally designated by reference numeral 20, is provided for releasable engagement with the pipeline 2 in a straddling relationship therewith. As illustrated in FIGS. 1, 2, 5 and 9, the clamping means 20 is secured to the bottom frame portion of the support frame 5 by means of a bracket and pin assembly, generally designated by reference numeral 5', and clearly illustrated in FIG. 9. The clamping means 20, illustrated herein as being suitable for use in the present invention, is of the type disclosed and described in U.S. Pat. No. 3,897,099, granted on July 29, 1975, to Ambrogio Scodino et al.

The clamping means 20 is shaped according to a curvilinear shape adapting itself to the outer diameter of the pipeline 2 to be grasped. The clamping means 20 include a pair of longitudinally spaced clamping jaws 21 positioned on each side of the pipeline 2 with each of the jaws having a claw 21a on its lower inner face which has the curvilinear shape of the diameter of the pipeline to be grasped. For a more detailed description of the clamping member 20, reference is to be had to FIG. 9 wherein one pair of the opposed clamping jaws 21 are shown, with the other pair of opposed jaws 21 not being visible. As shown, each of the opposed clamping jaws 21 are pivotally connected at its upper end by a suitable pin to a linkage mechanism 21b with each mechanism being operatively connected respectively to opposite sides of a double-acting hydraulic cylinder system generally designated by reference number 21c. The hydraulic cylinder system 21c includes one piston element operatively connected to one of the linkage mechanisms 21b and a second piston element operatively connected to the other linkage mechanism 21b. The two piston elements coaxially slide with respect to one another in the manner described with like elements in U.S. Pat. No. 3,897,099 to open and close the jaws 21. The piston elements of the hydraulic cylinder system 21c are actuated by a hydraulic motor (not shown).

The clamping means 20 is provided with an exterior casing 22 to which a cutting mechanism 23 is secured. The cutting mechanism 23 is shown in greater detail in FIGS. 10-12. As illustrated, the cutting mechanism 23 includes two half-rings 24 which are hingedly secured at their tops to one another and to the exterior casing 22 by means of pin 25. The half-rings 24 can be closed to engage the pipeline 2 in a circular state on or pivoted outwardly at their jointure point in order to be free from the pipeline 2 as shown in phantom lines in FIG. 10 by a double-acting hydraulic cylinder 26 actuated by a hydraulic motor (not shown).

Figure 10:
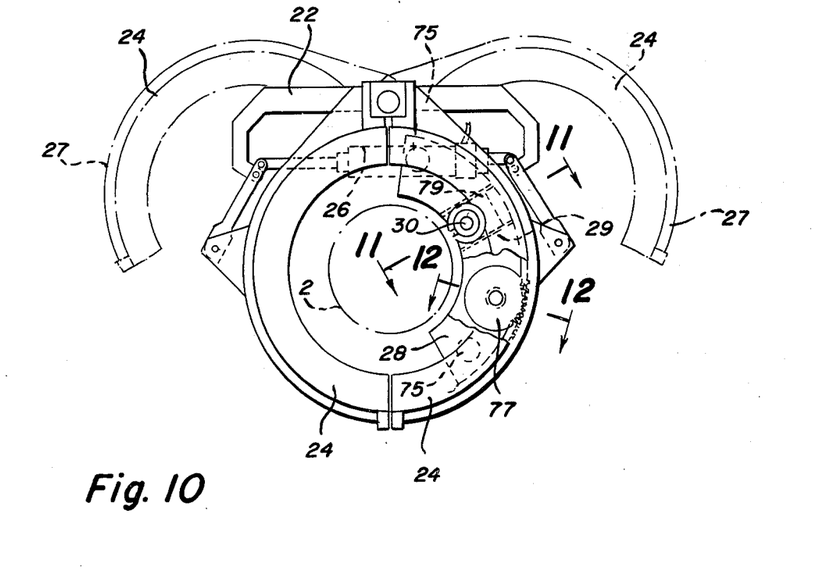
FIG. 10 is a front view of the cutting wheel made in accordance with the present invention illustrating the engagement of the cutting wheel with the pipeline and the cutting wheel in an open state is illustrated by broken lines.
Figures 11, 12, 13:
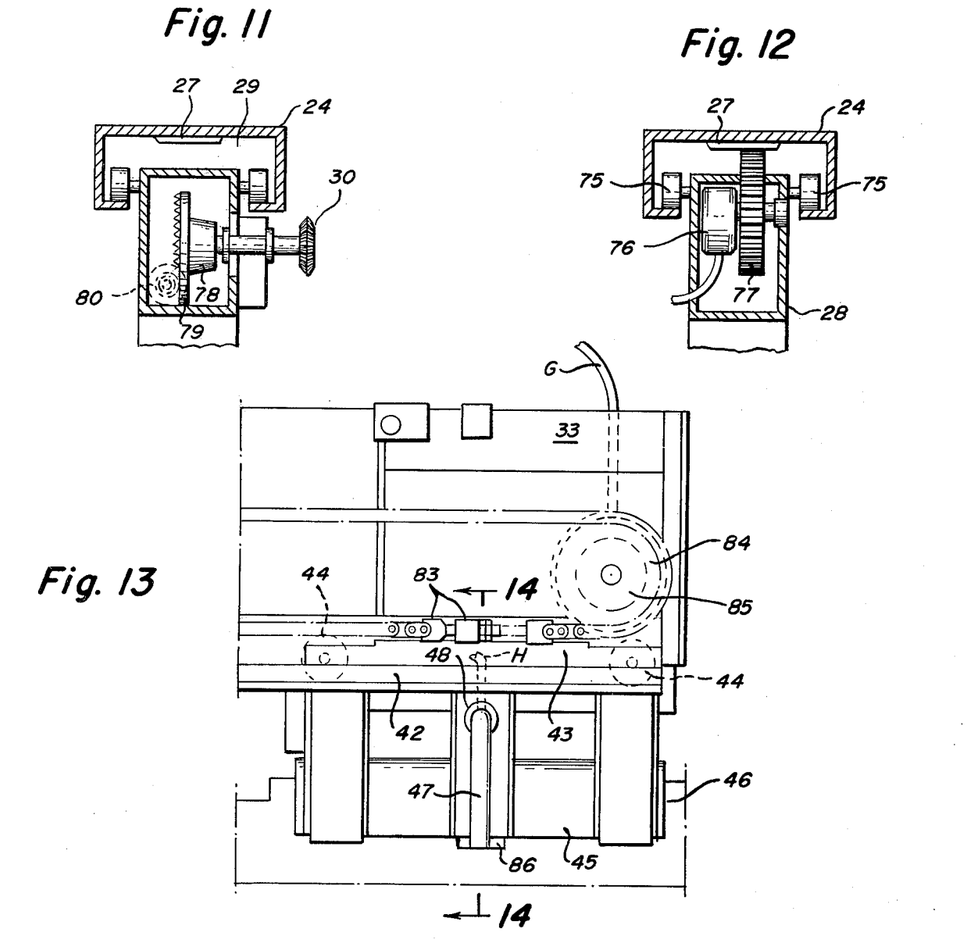
FIG. 11 is a cross-section view taken on lines 11—11 of FIG. 10.
FIG. 12 is a cross-sectional view taken on lines 12—12 of FIG. 10.
FIG. 13 is a side elevation illustrating the association of the dolly and the header to one another.

Each of the half-rings 24, as best illustrated in FIGS. 11 and 12, are so formed as to provide, in cross-section, channel sections which will receive and support a dolly 28 therein. The two half-rings 24 are each provided with a half-cross gear or crown gear 27 which is integrally formed on the outside or forward face of each half-ring 24 as shown in FIGS. 1 and 10. The half-cross or crown gears 27, when the half-rings 24 are in a closed state, function as a supporting member and as a circular guide for a dolly 28 for movement therealong and within the formed channel section of the half-rings 24. The dolly 28 is provided with rolling wheels 75, as shown in FIGS. 1 and 10-12, which rest on the shoulder portion of the formed channel sections of the half-rings 24, as shown in FIGS. 11 and 12. The dolly 28 is driven around the half-rings 24 by a hydraulic motor 76, as illustrated in FIG. 12, with such operation actuating a gear wheel 77 which will mesh with the half-ring or crown gears 27 of the half-rings 24.

The cutting mechanism 23 is provided with a cutting wheel 30 which extends forwardly from the dolly 28 as shown in FIG. 1. The cutting wheel 30, as shown in FIG. 11, is rotated by a hydraulic motor 78 which is mounted to a vertical support member 79. The vertical support member is slideable between two slideways 29 mounted on the dolly 28 by means of a hydraulic motor 80. The hydraulic motor 80 is mounted on the dolly 28 and rotates the gear 81 which is in operative mesh with the vertical rack 82 which is integrally associated with the sliding vertical supporting member 79. This arrangement will permit the cutting of the pipeline 2.

Two small brackets 31 are provided, one for each side of the frame 5 on the end of the frame 5 opposite to the end bracket 11 of the frame 5, with only one of such brackets 31 being shown in FIG. 1. The lower end of each of a pair of laterally spaced vertical rods or a rectalinear vertical sub-frame 33 is positioned between the two brackets 31 and secured therebetween at the bottom ends thereof in pivotal or hinged relationship with the brackets 31 by means of a horizontally disposed through pin or shaft 32. Each vertical rod or the rectalinear vertical sub-frame 33 is provided intermediate its respective ends with an inwardly extending side tab 34. Each of the two side tabs 34 is hingedly connected by means of a small block 36 and a pin 35 to one end of a piston 37 of hydraulic jack 38. FIG. 1 shows a connection of only one side tab and one piston of the hydraulic cylinder while FIG. 10 illustrates a pair of hydraulic jacks 38 and their association with the pair of vertical rods 33. The cylinder 39 of each of the hydraulic jacks 38 is hingedly connected by means of a pin 40 to a bracket 41 carried by a vertical portion of the frame 5.

Figure 14:
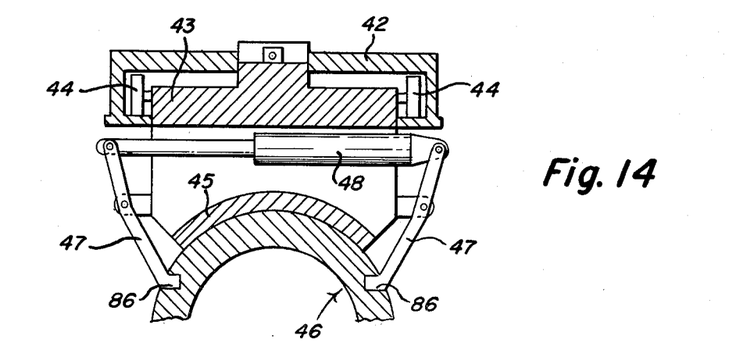
FIG. 14 is a cross-sectional view taken on line 14—14 of FIG. 13.

Reference is now to be had with respect to FIGS. 13 and 14 wherein each of the vertical rods or sub-frame 33 is shown as being provided with a longitudinal guideway 42 along which a dolly 43 provided with wheel 44 can move. The dolly 43 is provided at its top with a longitudinally extending chain 83 which is adapted to run about a pair of longitudinally spaced pinions 84 (see FIG. 1) with a hydraulic motor 85 being provided to rotatably drive one of the pinions 84 to effect the rotation of the chain 83 therearound. The dolly 43 is fastened to a supporting bridge 45 which is positioned within an appropriate slot of a sealing and pulling header 46 and is secured thereto by an automatic release system.

As illustrated in FIGS. 13 and 14, the release system comprises a pair of pins 47 which are inserted into a pair of bores 86 formed in the header 46 by means of the plunger of a double-acting hydraulic cylinder 48 affixed to the supporting bridge 45. The sealing and pulling header 46, which is removably supported by the rod 33, is provided with an internally formed longitudinal bore 49 which, when the header 46 is inserted into the pipeline 2, extends axially of the pipeline 2 to permit the passage of water from the pipeline 2. At a position within the pipeline 2, when the header 46 is inserted therein, is a bore 50 which extends transversely of the pipeline 2. The end 51 of the header 46 which, when the header 46 is in an inserted state, projects from the pipeline 2, is ogivally shaped.

Figure 3:
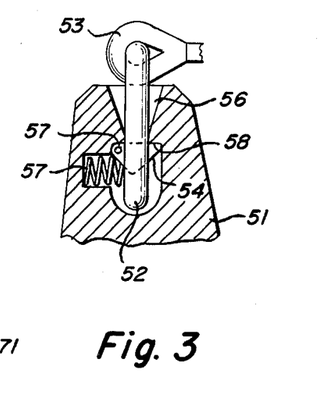
FIG. 3 is an enlarged detail view of the automatic fastening means between the pulling cable and the recovery header.
Figure 15:
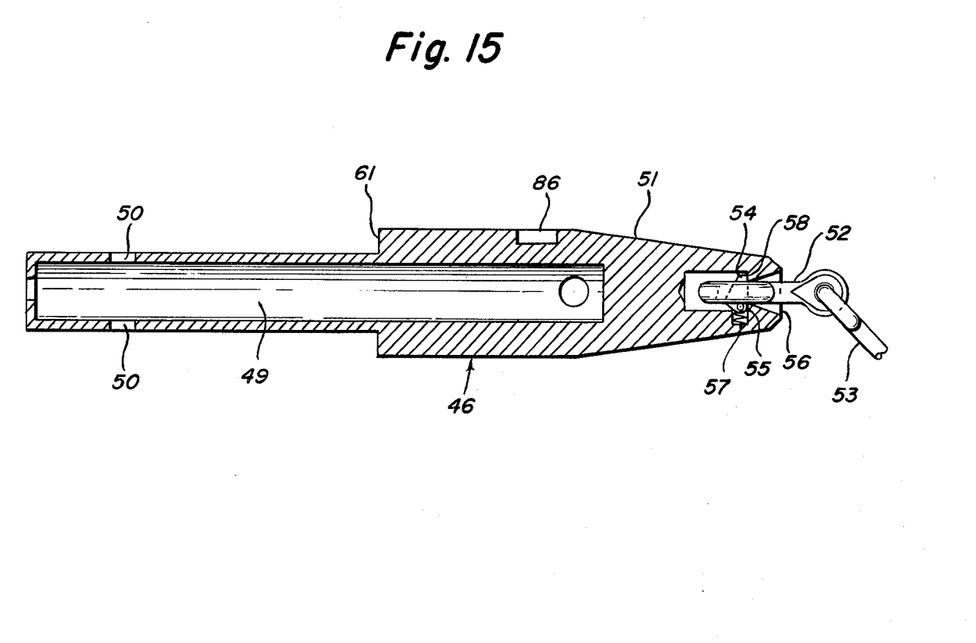
FIG. 15 is an enlarged cross-sectional view of the sealing and pulling header made in accordance with the present invention illustrating automatic latching system.

An automatic fastening device, as best shown in FIGS. 3 and 15, for hooking the end ring 52 of a pulling cable 53 for lifting the pipeline 2 to be recovered on the pipelaying barge, comprises a tooth 54 which is hinged at one end on the pin 55 within a recess 56 of the ogival end 51 of the header 46 and is urged by a spring 57 with its other end against a shoulder 58 formed in the recess 56.

In the operation of the system just described, the actuation of the hydraulic jacks 38 will cause the pair to reach the position 39' shown in phantom in FIG. 1 by rotating in the direction of the arrow 59 and the rod 33, the supporting bridge 45 and the header 46 will also be rotated in the direction of the arrow 60 and will thus reach the phantom positions 33', 45' and 46', respectively. This movement will result in the header 46' being in a position coaxial with the pipeline 2 to be recovered, and will thus be capable of being easily slipped into the pipeline by moving the dolly 43 along the guideway 42. The introduction of the header 46 into the pipeline end will continue until a shoulder 61 of the header 46 abuts the free end 62 of the pipeline 2 to be recovered. In this position, the transverse bore 50 of the header 46 will be located inside the pipeline 2 at a position at which, on the lower portion of the frame 5, the drilling and doweling device 63 will be located.

Figure 4:
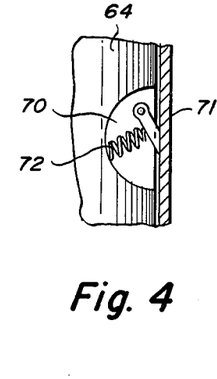
FIG. 4 is an enlarged detail view, partially borken away, of the retaining dowel and its cylinder.
Figure 5:
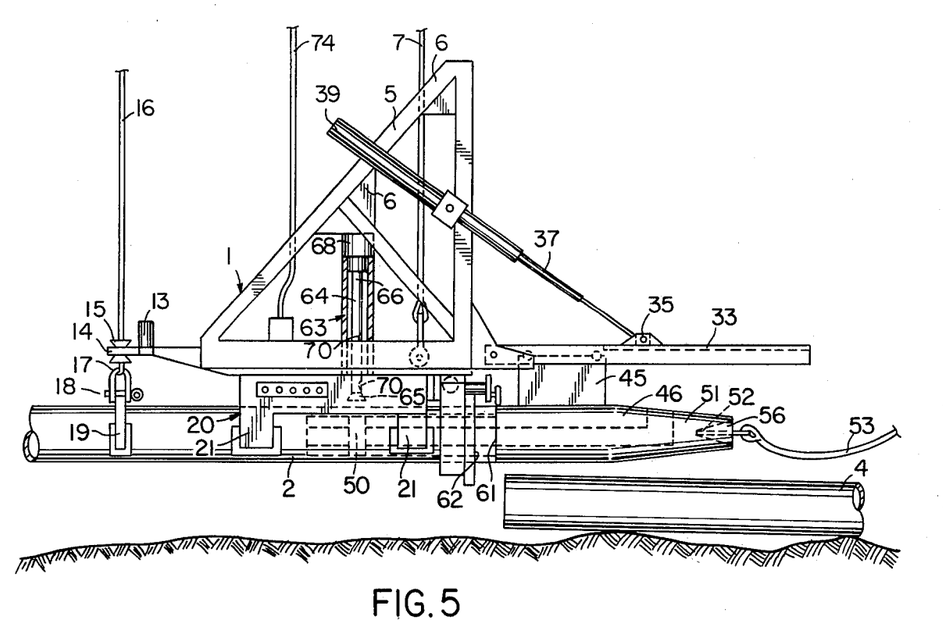
FIG. 5 is another diagramatic side elevational view, partly in section, of the recovery apparatus made in accordance with the present invention with the sealing and pulling header in engagement with the cut pipeline.
Figure 6:
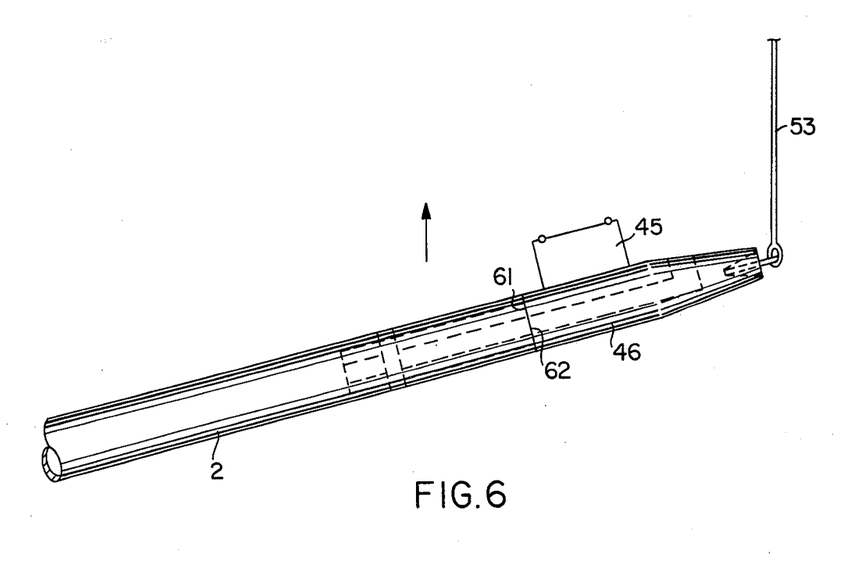
FIG. 6 shows a diagramatic side elevational view of the sealing and pulling header and cut pipeline after the header has been released from the support of the apparatus of the invention.
Figure 16:
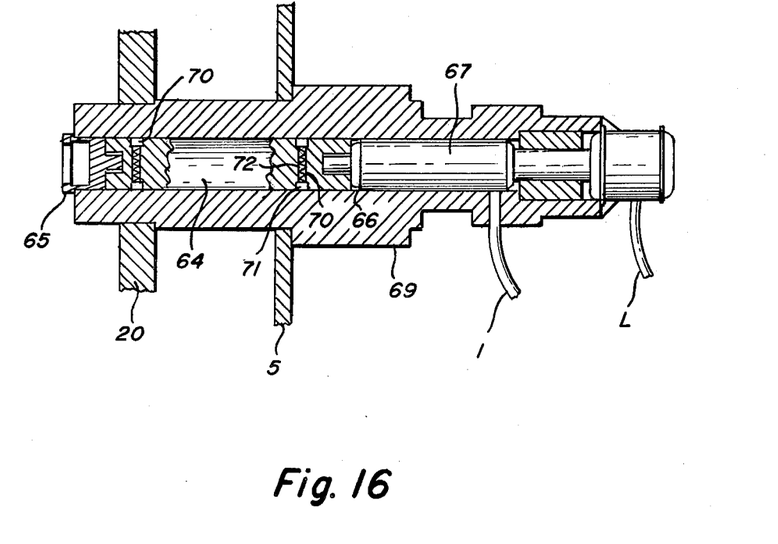
FIG. 16 is an enlarged cross-sectional view of the drilling and doweling mechanism made in accordance with the present invention.

The drilling and doweling device 63, which is positioned between the jaws 21 of the clamping mechanism 20, is formed by a rod or dowel 64 which is positioned in a vertical slot with the bottom portion thereof being provided with a cutting wheel 65 secured thereto by any suitable means. The dowel 64 of the drilling device 63 is affixed at its top end to a piston 66 of a hydraulic jack 67 by any suitable means, such as, for example, screws. The hydraulic jack 67 is axially rotatable, together with the dowel 64, by a hydraulic drive means 68 which has a vertical cylinder 69 connected to the frame 5. As shown in FIGS. 4 and 16, the rod or dowel 64 of the drilling device 63 has recesses 70 in the interior thereof with pins 71 being hinged therein. The pins 71 are biassed by springs 72 so as to move them out of the recesses, the ejection being normally prevented by the internal wall of the vertical cylinder 69. However, when the dowel 64 is moved into the transverse bore 50, the pins 71 spring out to retain the dowel 64 in the bore 50, with the dowel 64 thus retaining the header 46 in the pipeline 2.

As shown schematically in FIG. 1 and in enlarged detail in FIG. 17, all the hydraulic jacks and motors of the apparatus 1 are remotely controlled by the respective pushbuttons A–L which are positioned in a pushbutton control dashboard 73 installed in a convenient position on the clamping and lifting means 20, the hydraulic power for their operation being fed to the machine 1 by the pipelaying barge through a conduit system which has been symbolically represented in the drawing by a single tubing 74. In FIGS. 2, 11, 12, 13 and 16, lydraulic lines are shown and designated by reference letters corresponding to a reference letter pushbutton on the control panel 73.

In the operation of the machine 1, when a pipeline 2 is to be recovered, the pipeline is first located, for example, by divers, and the guide cable 16 is then attached by means of clamp 19 and tensioned using a winch W on the pipelaying barge M. The apparatus 1 is then lowered from the pipelaying barge M, using the cable 7, to the pipeline 2, with the apparatus being guided by the guide cable 16 passing through the eye 15. When the apparatus 1 reaches the pipeline 2, the clamping means 20 is actuated by a diver by means of the appropriate pushbutton on the panel 73 and the pipeline 2 is thus clamped to the apparatus 1. The apparatus, with the pipeline 2, is then raised a short distance to free it from the sea bed 3. Next, the half-rings 24 are actuated to engage and encircle the pipeline 2 and the cutter wheel 31 is actuated to cut off the portion 4 of the pipeline which may, for example, be damaged. The hydraulic jacks 38 are then actuated by an appropraite pushbutton to bring the header 46 into the position 46', and the dolly 43 is actuated to insert the header 46 into the newly cut off pipeline section 4 up to the shoulder 61.

The drilling and doweling device 63 is then actuated to drill holes in the pipeline and to insert the dowel 64 through the drilled holes and the transverse bore 50. Water is then expelled from the pipeline 2 by passing a cylindrical slug, or pig, or a ball or balls, down the pipeline from the end remote from the newly cut off end. The pig or balls may be passed into the pipeline by compressed air. The water will then be expelled from the pipeline through the bore 49. The clamping means 20 are then released and the flange 14 and the header 46 are disconnected from the support 5, which is then raised to the surface. A cable 53 is then fastened to the header 46 and the header 46 and the pipeline section 4 can then be hoisted to the surface.

It should be noted that when strong sub-surface currents are present it may not be easy to take down the cable 53 to the header 46. In such circumstances, after the water has been expelled from the pipeline 2, support 5 is raised, with the header 46 and the pipeline 2, using the cable 7. When the support is near the surface of the water, divers fasten the cable 53 to the header 46 and the entire assembly is then lowered to the bottom again. The clamping means 20 then releases the pipeline, the flange 14 and the header 46 are disconnected from the support, and the support is then raised to the surface. The header 46, with the pipeline 2, can then be hoisted using the cable 53 as previously described.

We claim:

1. Apparatus for use in recovering a submerged pipeline comprising support means having clamping means for clamping the support means on a pipeline to be recovered; a cutter mounted on the support means and arranged to cut through the pipeline when the support means is clamped on the pipeline, to afford a pipeline end; a recovery header, releasably mounted on said support means; drive means connected to said support means for moving said header relatively to said support means between a rest position and an inserted position in which, when said support means are clamped on the pipeline, said header is inserted in the pipeline in the region of the cut pipeline end; retaining means for retaining said header in the inserted position; and means connected to said header and support means adapted to release said header with the retained pipeline from said support means and remove said header and retained pipeline therefrom.

2. Apparatus in accordance with claim 1 wherein the apparatus is operatively connected to a surface vessel to which the cut pipeline is to be lifted.

3. Apparatus in accordance with claim 1 wherein the clamping means comprises at least one pair of oppositely acting jaws for clamping the pipeline.

4. Apparatus in accordance with claim 1 wherein attachment means are provided on said support means for attaching a cable to said support means for connecting the apparatus to a vessel.

5. Apparatus in accordance with claim 4 wherein the attachment means are disposed on the support means at a location which, in use, is adjacent a lower portion of the support means.

6. Apparatus in accordance with claim 1 wherein guide means are operatively connected to said support means for guiding the apparatus onto a pipeline to be recovered.

7. Apparatus in accordance with claim 6 wherein the guide means comprises a guide cable for preliminary attachment to the pipeline, and in which said support means is provided with eye means for receiving said guide cable.

8. Apparatus in accordance with claim 7 wherein the eye means are positioned in a flange which is releasably connected to a bracket mounted rigidly on said support means.

9. Apparatus in accordance with claim 8 wherein the flange is releasably connected to said bracket by means of a release pin which extends through registering holes in said flange and in said bracket.

10. Apparatus in accordance with claim 9 wherein the release pin is connected to the piston of a double-acting hydraulic jack operatively connected to said support means.

11. Apparatus in accordance with claim 1 wherein the said cutter comprises a pair of ring segments connected to said support means and mounted for pivotal movement relative thereto for closing above said pipeline and adapted to provide a crown gear surrounding a pipeline to be recovered, said crown gear supporting a dolly which is provided with hydraulic drive means for driving said dolly around the crown gear, the dolly carrying a cutting wheel which is movable by hydraulic feed means relative to said dolly in the radial direction of the crown gear, and a hydraulic motor for driving said cutting wheel in rotation.

12. Apparatus in accordance with claim 1 wherein the recovery header is mounted on a sub-frame pivotally mounted on the support means, at least one hydraulic jack being pivotally mounted on said support means for pivoting said sub-frame relatively to said support means, said sub-frame having a guideway and carrying a dolly which is movable along said guideway by hydraulic drive means, said recovery header being releasably connected to said dolly, the arrangement of said sub-frame being such that pivotal movement of the sub-frame relative to the support means moves said header from the rest position to a position in which said header, in use, is disposed adjacent the pipeline end, and movement of said dolly along said guideway causes insertion of said header into the pipeline.

13. Apparatus in accordance with claim 12 wherein the fastening means are positioned on the header at a location thereon which, in the inserted position of said header, projects from the pipeline end, said fastening means being adapted to receive a ring on the end of a cable and comprising a recess in said header within which recess is pivotally mounted a tooth which is spring loaded to urge said tooth to pivot into contact with a shoulder facing inwardly of said recess, whereby said tooth is urged into a position in which it extends across the mouth of said recess to prevent removal of a ring encircling said tooth and partially accommodated within said recess.

14. Apparatus in accordance with claim 12 wherein the header includes a shoulder thereon adapted to abut the pipeline end when said header is in the inserted position to limit the movement therein.

15. Apparatus in accordance with claim 12 wherein the header includes a bore which extends, when said header is in the inserted position, axially on the pipeline to enable fluid within the pipeline to be discharged through said header.

16. Apparatus in accordance with claim 15 wherein the header includes a bore which extends, when said header is in the inserted position, transversely of the pipeline, and in which said retaining means comprises means for drilling an opening in the pipeline, at a position in register with said transverse bore, and means for inserting a dowel into said opening and transverse bore to prevent withdrawal of said header from the pipeline.

17. Apparatus in accordance with claim 16 wherein the means for inserting the dowel comprises a hydraulic jack, the piston of which is releasably connected to said dowel, and in which the means for drilling an opening in the pipeline comprises a hydraulic motor connected to and for rotation of said dowel about its longitudinal axis, and a cutting element releasably secured to one end of said dowel for cutting said opening in the pipeline.

18. Apparatus in accordance with claim 17 wherein the diameter of the transverse bore in the header is greater than the diameter of the cylinder of the hydraulic jack comprising means for inserting said dowel, and in which the dowel includes recesses in which are spring-loaded pins biasses outwardly therefrom, the pins normally being held within the recesses by the wall of the cylinder of the hydraulic jack but extending outwardly of the recesses when the dowel is inserted into the transverse bore to retain the dowel therewithin.

19. Apparatus in accordance with claim 18 wherein the retaining means are disposed between two pairs of jaws of the clamping means.

20. Apparatus in accordance with claim 19 wherein the header is elongated in configuration and in which the end of the header which, in the inserted position of the header, projects from the pipeline end in ogival shape.

21. Apparatus in accordance with claim 1 wherein a control panel is provided on said apparatus, said apparatus comprising a plurality of manually operable hydraulic control elements for controlling the operation of the clamping, cutting and retaining means of said apparatus.

22. Apparatus as claimed in claim 15, in which said support comprises a twin-latticed frame.

23. A method of recovering a submerged pipeline, comprising lowering pipeline recovering apparatus which includes support means to the pipeline to be recovered, clamping the apparatus to the pipeline means, cutting through the clamped pipeline with cutting means carried by said support means, moving header means releasably mounted to the support means into the clamped and cut pipeline, retaining the header means within the cut pipeline, releasing said header means and the retained pipeline from the support means, and raising said header means with the retained pipeline to the surface.

24. A method in accordance with claim 23 which further includes attaching a guide cable to the pipeline and placing the guide cable under tension for guiding the apparatus to the pipeline to be cut and removed.

25. A method in accordance with claim 23, which further includes removing fluid from the cut and retained pipeline before removal thereof.

26. A method in accordance with claim 23 which further includes, after releasing the header means with the retained pipeline from the support means and raising the header means with the retained pipeline, the steps of releasing the support means from the pipeline and raising the apparatus means, including the support means, clamping means and cutting means, apart from the header means, to the surface.

27. A method in accordance with claim 23 which further includes, after retaining the header means within the cut pipeline and before releasing the header means with the retained pipeline, the steps of raising the apparatus, with the pipeline clamped thereto, to a small depth, relative to the total depth, below the surface, connecting cable means to the header means for raising the header means and lowering the apparatus, with the pipeline, to the bottom of the water.

* * * * *